Feb. 21, 1967  W. D. VOELKER  3,305,419
METHOD OF PRODUCING AN EMBOSSED PANEL
Filed March 28, 1962
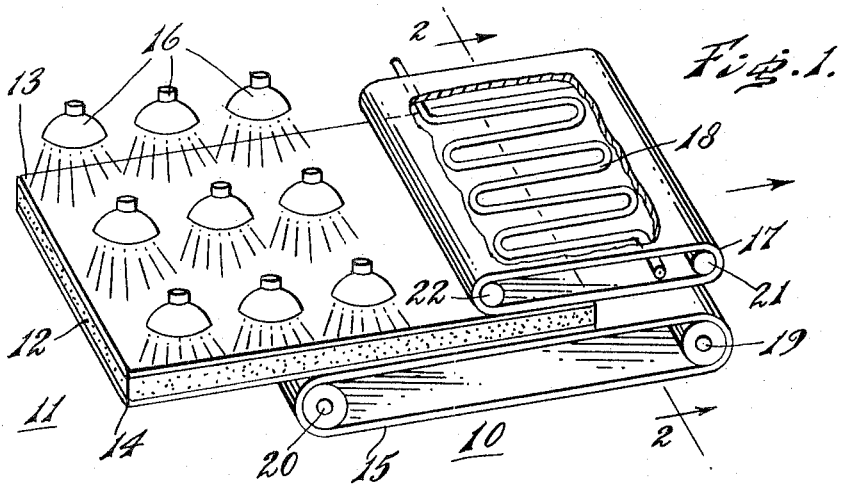
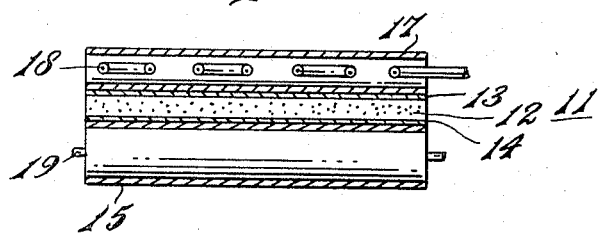
INVENTOR
Walter D. Voelker
BY John R. Eubank
ATTORNEY

United States Patent Office 3,305,419
Patented Feb. 21, 1967

3,305,419
METHOD OF PRODUCING AN EMBOSSED PANEL
Walter D. Voelker, Philadelphia, Pa., assignor, by mesne assignments, to Allied Chemical Corporation, New York, N.Y., a corporation of New York
Filed Mar. 28, 1962, Ser. No. 183,223
1 Claim. (Cl. 156—209)

This invention relates to a method of preparing panels having a predominant thickness of rigid plastic foam and a minor thickness of a thermoplastic facing sheet, and is particularly concerned with the step of embossing the facing sheet to provide a three dimensional pattern without doing thermal damage to the layer of plastic foam.

Heretofore there have been proposals for the production of insulation panels comprising a plastic foam insulating member and a facing sheet adapted to provide the type of ornamentation desired for the interior decorating of rooms. In accordance with some previous procedures, the facing sheet having a three dimensional pattern, such as simulated paneling, simulated leather, and or other three dimensional ornamention have been adhesively bonded to a pre-formed slab of plastic foam. Difficulties have been encountered in the use of laminated panels by reason of the lack of durability of the adhesion between layers. There have also been proposals for the production of panels by the coating of facing sheets with a polyurethane foam-forming composition and the advancing of the coated facing sheet through a plurality of zones including an expansion zone, curing zone, and an end product zone. The panels produced by the foaming of the coating on facing sheets generally possess numerous advantages over the mutli-layer structures fastened together with adhesive. Moreover, this method of production is quite satisfactory for the manufacture of the insulation panels having a smooth surface. However, attempts to produce embossed panels by this method have encountered difficulties by reason of the damage to the artistic appearance of the embossed facing sheet during the passage of the multi-layer structure through the curing zone. Difficulties have also been encountered in metering thin films of coating material onto embossed sheets. The temperature normally involved in the curing of rigid polyurethane plastic foam is sufficiently high and maintained for a sufficiently prolonged period of time that the three dimensional shape of the pre-embossed facing sheet is distorted.

Heretofore, plastic foam of the low density (e.g. 2 pounds per cubic foot) has sometimes been densified to a high density (e.g. 50 pounds per cubic foot) by locally applied heat. Attempts to soften facing sheets on polystyrene foam slabs have sometimes resulted in thermal damage (e.g. densification) of the plastic foam layer.

In accordance with the present incention, an insulating panel consisting essentially of a predominant thickness of plastic foam and a thermoplastic facing sheet having an embossed three dimensional pattern is manufactured by first producing a panel having the rigid plastic foam secured to a smooth thermoplastic facing sheet, and the thus prepared smooth panel is advanced through a surface softening zone in which the facing sheet is heated to its softening temperature so rapidly that adjacent portions of the plastic foam are not thermally damaged, and the surface-heated panel is advanced through an embossing zone in which the thermoplastic facing sheet is both embossed and cooled to a temperature below its softening temperature. The speed with which the panel is quench-embossed is not necessarily the same as the speed at which insulation panels are produced, thus making it advantageous (but not absolutely essential) to control the quench-embossing step as a method separated from the regular manufacture of insulation panels.

The invention is further clarified by reference to the accompanying drawings, in which FIG. 1 is a schematic view of the method of the present invention. FIG. 2 is a sectional view taken on line 2—2 of FIG. 1.

A quench-embossing machine 10 is adapted to advance through a plurality of zones and process a panel 11 comprising a plastic foam core 12, an upper facing sheet 13 characterized as a thermoplastic material, and a bottom facing sheet 14. An advancing belt 15 can move the panel 11 underneath a plurality of heating lamps 16 adapted to heat the facing sheet 13 to a softening temperature, the forward speed of the panel 11 being great enough that the portion of the plastic core 12 adjacent to the facing sheet 13 are not thermally damaged. The thus softened thermoplastic facing sheet 13 is quickly advanced into contact with an embossing belt 17 maintained at a relatively cool temperature by the action of cooling pipes 18. The belt 15 moves around rollers 19 and 20 at the same forward speed as the embossing belt 17, which moves around rollers 21 and 22.

The cooled embossing belt maintains the quench-embossing action during a longer period of time than embossing rolls, another species of embossing members. Important advantages are achieved by the pre-heating of the thermoplastic surface in the pre-embossing zone and the embossing of the facing sheet with a cooled embossing member, instead of the approach toward embossing involving the use of a pre-heated embossing member.

Various modifications of the method are possible without departing from the scope of the appended claim.

The invention claimed is:

The method of producing an embossed panel consisting essentially of a predominant thickness of rigid polyurethane foam and a thermo-plastic facing sheet secured thereto, said sheet having an embossed three-dimensional pattern which comprises first producing a panel having a rigid plastic foam secured to a smooth thermo-plastic facing sheet; advancing said panel through a surface softening zone wherein heat is rapidly applied to the exposed surface of the thermo-plastic facing sheet and thereafter advancing said panel to an impression zone wherein the facing sheet is embossed and quenched by contact with embossing members cooled sufficiently to cool the facing sheet below the temperature at which further embossing might be feasible.

References Cited by the Examiner
UNITED STATES PATENTS

| | | | |
|---|---|---|---|
| 2,759,866 | 8/1956 | Seymour. | |
| 2,776,452 | 1/1957 | Chavannes | 18—10 |
| 2,946,713 | 7/1960 | Dusina et al. | 156—219 |
| 2,956,310 | 10/1960 | Roop et al. | |
| 2,999,041 | 9/1961 | Lappala | 161—49 |
| 3,058,863 | 10/1962 | Gaines et al. | |
| 3,062,698 | 11/1962 | Aykanian | 156—311 |
| 3,093,525 | 6/1963 | Wilson et al. | |
| 3,142,599 | 7/1964 | Chavannes | 156—210 |
| 3,196,062 | 7/1965 | Kristal | 156—79 |

EARL M. BERGERT, *Primary Examiner.*
H. F. EPSTEIN, *Assistant Examiner.*